(12) United States Patent
Janke et al.

(10) Patent No.: US 7,814,396 B2
(45) Date of Patent: Oct. 12, 2010

(54) APPARATUS AND METHOD FOR CHECKING AN ERROR RECOGNITION FUNCTIONALITY OF A MEMORY CIRCUIT

(75) Inventors: Marcus Janke, Munich (DE); Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 944 days.

(21) Appl. No.: 11/622,787

(22) Filed: Jan. 12, 2007

(65) Prior Publication Data
US 2007/0226551 A1    Sep. 27, 2007

(30) Foreign Application Priority Data
Jan. 13, 2006    (DE) .................. 10 2006 001 873

(51) Int. Cl.
*G11C 29/00* (2006.01)
(52) U.S. Cl. .................. 714/766; 714/47; 714/48; 714/807
(58) Field of Classification Search .............. 714/758, 714/766, 799, 47, 48, 807
See application file for complete search history.

(56) References Cited

U.S. PATENT DOCUMENTS

| | | | |
|---|---|---|---|
| 3,699,323 A | 10/1972 | Reinheimer | |
| 3,959,638 A | 5/1976 | Blum et al. | |
| 4,048,481 A | 9/1977 | Bailey, Jr. et al. | |
| 4,837,624 A * | 6/1989 | Heitmann et al. | 348/616 |
| 4,951,282 A * | 8/1990 | Mester | 714/704 |
| 5,251,219 A * | 10/1993 | Babb | 714/755 |
| 5,341,428 A | 8/1994 | Schatz | |
| 5,515,383 A | 5/1996 | Katoozi | |
| 5,686,885 A | 11/1997 | Bergman | |
| 5,736,777 A | 4/1998 | Shield et al. | |
| 5,872,790 A | 2/1999 | Dixon | |
| 6,223,309 B1 | 4/2001 | Dixon et al. | |
| 6,654,648 B2 | 11/2003 | Nada et al. | |
| 6,658,606 B1 * | 12/2003 | Link et al. | 714/703 |
| 6,967,743 B1 * | 11/2005 | Kumazawa | 358/1.9 |
| 7,120,846 B2 * | 10/2006 | Kawagishi et al. | 714/748 |
| 7,444,551 B1 | 10/2008 | Johnson et al. | |
| 2003/0182611 A1 | 9/2003 | Wu | |
| 2005/0050387 A1 | 3/2005 | Mariani et al. | |
| 2005/0086572 A1 | 4/2005 | Hirabayashi | |
| 2005/0182997 A1 | 8/2005 | Kushida et al. | |

OTHER PUBLICATIONS

Wikipedia's Coprocessor, version from Nov. 25, 2005 http://en.wikipedia.org/w/index.php?title=Coprocessor&oldid=29213223.

* cited by examiner

*Primary Examiner*—Esaw T Abraham
(74) *Attorney, Agent, or Firm*—Dickstein, Shapiro, LLP

(57) ABSTRACT

Checking an error recognition functionality of a memory circuit including a memory that stores a datum, and a check value circuit that executes the error recognition functionality, is performed by a monitoring circuit. The memory circuit provides the datum to the check value circuit, wherein the check value circuit checks the datum provided thereto for errors and outputs an error signal if an error is present. The monitoring circuit is coupled to the check value circuit and influences the check value circuit, the memory circuit or the datum provided to the check value circuit so that the check value circuit discovers an error in a check in a case of correct execution of the error recognition functionality, and outputs an alarm signal if the check value circuit does not output an error signal upon the influence of the monitoring circuit.

21 Claims, 2 Drawing Sheets

APPARATUS AND METHOD FOR CHECKING AN ERROR RECOGNITION FUNCTIONALITY OF A MEMORY CIRCUIT

CROSS-REFERENCE TO RELATED APPLICATION

This application claims priority from German Patent Application No. 10 2006 001 873.7, which was filed on Jan. 13, 2006, and is incorporated herein by reference in its entirety.

BACKGROUND OF THE INVENTION

The present invention relates to an apparatus for checking an error recognition functionality of a memory circuit, in particular in the field of chip cards or smartcards, which are employed in sensitive areas, for example, and thus may be subject to attacks.

In sensitive areas concerning security, various technical protective measures are employed. These protective measures enable, for example, users to access certain computer systems, authorized persons to be permitted access to certain areas blocked for the public, or also to access secured information, such as private keys within the scope of a public key cryptography method, bank data, or credit card information. The authorized user, i.e. the authorized user of a computer system or also a person authorized to access a non-public area, for example, often obtains a chip card with a security controller identifying the user as authorized to a security system. A security controller is a microcontroller that may for example be employed on a chip card for monitoring security functions.

Such security systems and security circuits, for example including chip cards, already are subject to attacks, which are to be fended off by various countermeasures on the part of the security circuits, because of the value of the goods, information and privileges protected thereby. The functionality of the countermeasures has previously been checked by so-called UmSLC (user mode sensor life control) modules. Apart from corresponding supply circuits and evaluation circuits, the central components of the countermeasures have previously been sensors supposed to recognize the attacks. Among the sensors are voltage sensors, frequency sensors, temperature sensors and light sensors, for example. In order to check the functionality of the countermeasures, i.e. the functionality of the various sensors, their supply circuits, and the associated evaluation circuits, the sensors and/or their associated components were adjusted or stimulated by the UmSLC module so that an alarm was triggered. However, the triggered alarm was not judged to be an attack, in other words, this alarm was not switched effectively, but it was only checked whether it was generated at all. If the alarm did not take place within the scope of such a test, the UmSLC module assumed a manipulative attack having rendered the sensor inoperative. In such a case, the UmSLC module may itself generate and output an alarm signal, which may lead to the security controller of a chip card and/or the CPU (central processing unit) of the security controller being stopped, destroying or deleting sensitive information, or causing a reset of the security controller.

New countermeasures now are no longer or no longer exclusively based on analog sensors, which recognize changes in the environmental conditions or in the operating conditions of the security components concerned (for example of a security controller), but also comprise logic measures supposed to recognize changes in information, which is stored in the security controller, for example. Conventional UmSLC modules therefore no longer meet these requirements.

FIG. 2 shows a block circuit diagram of a possible solution of a memory circuit 800 with an error recognition functionality or EDC (error detection code) functionality. The memory circuit 800 is coupled to a bus 810, via which the memory circuit 800 can communicate with further components of a security controller, which includes the memory circuit 800. Via the bus 810, for example data signals, control signals, status signals and command signals may thus be exchanged between the memory circuit 800 and other components of the security controller, for example a CPU, an input/output module, or a cryptoprocessor. The memory circuit 800 is connected to the bus 810 via a memory control unit or a memory controller 820. The memory controller 820 is further connected to a memory matrix 850 via a plurality of row selection lines 830, also referred to as word lines, and via a plurality of column selection lines 840, also referred to as bit lines or input/output lines. The memory controller 820 is further coupled to an EDC module 860 via an internal data line and an error signal line. The EDC module 860 is further coupled to an EDC memory controller 870. An EDC memory matrix 880 is connected to the EDC memory controller 870 via a plurality of word lines 890 and a plurality of bit lines 900.

In the following, the functioning of the memory circuit 800 will be explained at the example of a read access. If the memory circuit 800 or the memory controller 820 receives the command to read out a certain memory address via the bus 810, the memory controller 820 accesses the memory matrix 850 via a row converter and a column converter the memory controller 820 includes via the plurality of word lines 830 and reads out a datum stored in the memory matrix 850 under the certain address via the plurality of bit lines 840. Thereupon, the memory controller 820 communicates the datum DA as well as the memory address underlying the datum DA to the EDC 860 via the internal data line. The EDC module 860 requests a corresponding checksum or check value, which is for example stored under the same address in the EDC memory matrix, from the EDC memory controller 870. To this end, the EDC memory controller 870 drives the EDC memory matrix 880 via the plurality of word lines 890 and obtains the checksum associated with the datum DA, which the EDC memory controller 870 communicates to the EDC module 860, via the plurality of bit lines 900. The EDC module 860 also calculates a checksum from the datum DA and compares it to the stored checksum. If both checksums satisfy a predetermined relation with respect to each other, i.e. if they match, for example, the EDC module 860 does not communicate an error signal FS (FS=Fehlersignal=error signal) via the error signal line. However, if both checksums do not satisfy the predetermined relation with respect to each other, i.e. if they do not match, for example, the EDC module 860 communicates an error signal FS via the error signal line to the memory controller 820, which may then for example forward the error signal FS to the CPU via the bus 810.

As memory, both read-only memories, i.e. for example ROM (read-only memory) memories, and memories that enable reading and writing accesses may be employed. Examples for the latter memories are RAM (random access memory) memories, non-volatile memories (NVM), such as flash memories or EEPROM (electrically erasable programmable read-only memory) memories, or also cache memories. Depending on the memory type used, the communication of the memory with other components, such as the CPU, does not necessarily take place via a bus, as it is shown in FIG. 2, but via another data link.

If the memory type permits a writing access to the memory circuit 800, this takes place in similar manner. In this case, the memory controller 820 drives the plurality of word lines 830 and the plurality of bit lines 840 so that the datum to be stored is stored at a memory location associated with a certain address. Moreover, the memory controller 820 communicates both the datum DA and the associated address to the EDC module 860. The EDC module 860 calculates a checksum from the datum and directs the EDC memory controller 870 to store the checksum under the address in the EDC memory matrix 880 by drives the plurality of word lines 890 and bit lines 900.

For calculating the checksum of a datum, various methods or algorithms may be employed here. The checksum frequently consists of a simple parity bit or a CRC (cyclic redundancy check) checksum or also a hash value, as it may be calculated with the algorithm MD5, MD2, or RIPEMD-160, for example.

Within the scope of an attack on the memory circuit 800, an attacker may for example try disrupting the EDC module 860 and hence also the error recognition functionality by a physical attack, maybe in form of targeted back-etching of selected regions of the chip including the memory circuit 800, and by applying electrical voltages or voltage pulses to certain regions of the chip. Hereby, the attacker may for example manipulate the content of the memory matrix 850 so that this manipulation cannot be recognized anymore. As a result, for example, a program code causing a microcontroller also included in the chip to give away actually secret data may be written into the memory 800. The above-described sensors are indeed basically suited for detecting a corresponding attack on the error recognition functionality of the memory circuit. Yet, these sensors are always sensitive to a certain set of attacks only.

BRIEF DESCRIPTION OF THE DRAWINGS

These and other objects and features of the present invention will become clear from the following description taken in conjunction with the accompanying drawings, in which.

DESCRIPTION OF THE INVENTION

Figure 1:
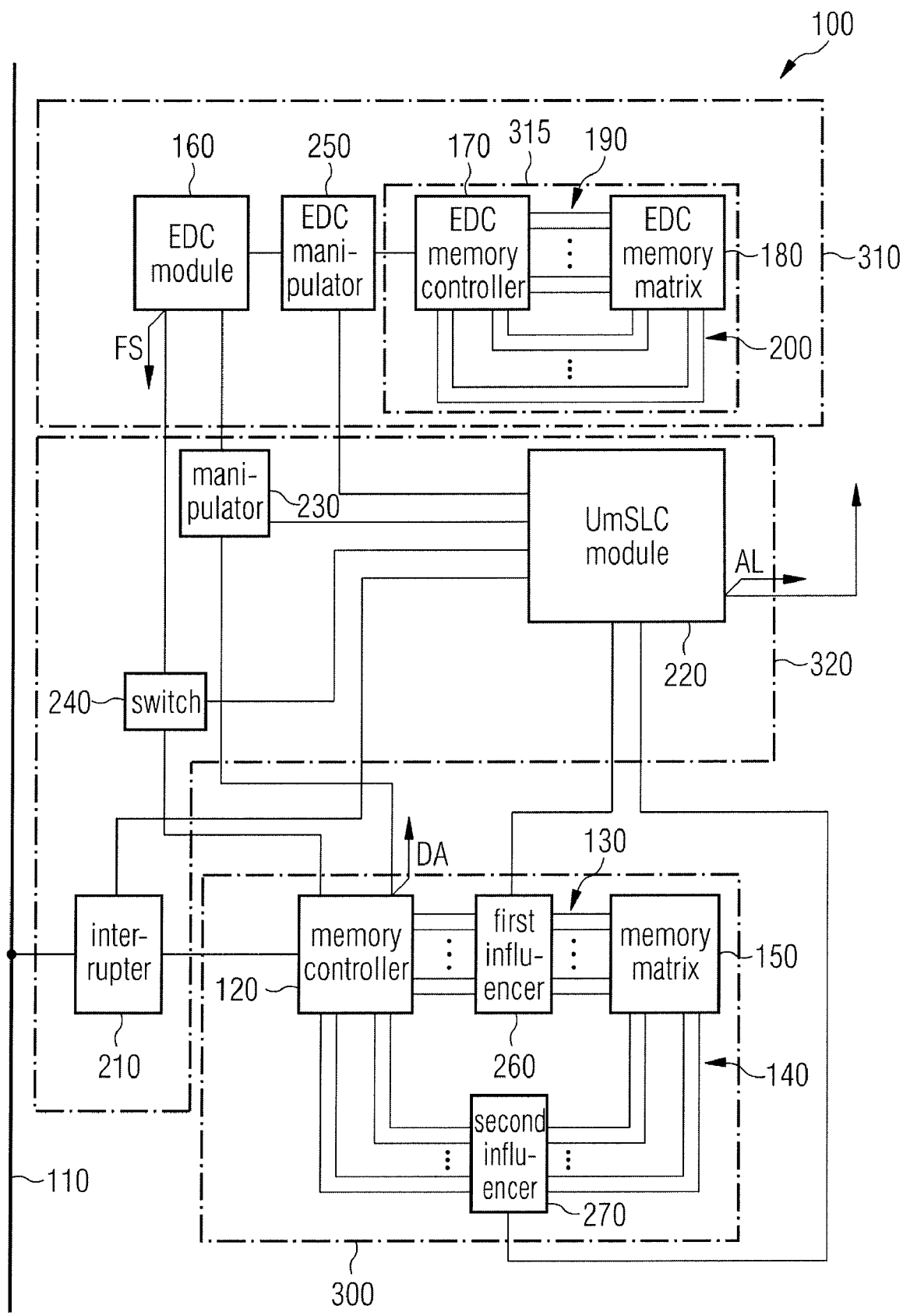
FIG. 1 is a block circuit diagram of an embodiment of a memory circuit with an apparatus for checking an error recognition functionality according to the invention.

The present invention provides an apparatus and a method enabling increased security against attacks on a memory circuit.

In accordance with a first aspect, the present invention provides an apparatus for checking an error recognition functionality of a memory circuit, wherein the memory circuit has a memory formed to store a datum and a check value circuit formed to execute the error recognition functionality, wherein the memory is formed to provide the datum to the check value circuit, and wherein the check value circuit is formed to check the datum provided thereto for errors and, if an error is present, output an error signal, having: a monitor coupled to the check value circuit to receive the error signal and formed to influence the check value circuit, the memory or the datum provided to the check value circuit so that the check value circuit would discover an error in a check in the case of correct execution of the error recognition functionality, and to output an alarm signal indicating incorrect execution of the error recognition functionality, if the check value circuit does not output an error signal to the monitor upon the influence.

In accordance with a second aspect, the present invention provides an apparatus for checking an error recognition functionality of a memory circuit, wherein the memory circuit has a memory formed to store a first and a second datum, a check value memory formed to store a first check value associated with the first datum and a second check value associated with the second datum, and a check value circuit formed to execute the error recognition functionality, wherein the second datum and the second check value lead to an error in a check, and wherein the memory and the check value memory are formed to provide the first or second datum and the respective associated check value to the check value circuit, and wherein the check value circuit is formed to check the first or second datum provided thereto for errors and, if an error is present, output an error signal at an error signal output, having: a monitor formed to transmit the error signal to the error signal output in a normal operation mode and to block the error signal in a check mode so as not to transmit the same to the error signal output and output an alarm signal indicating incorrect execution of the error recognition functionality, if the check value circuit does not output an error signal to the monitor, wherein the memory and the check value circuit are formed to provide and check the first datum and the first check value in the normal operation mode and to provide and check the second datum and the second check value in the check mode.

In accordance with a third aspect, the present invention provides a method for checking an error recognition functionality of a memory circuit, wherein the memory circuit has a memory formed to store a datum and a check value circuit formed to execute the error recognition functionality, wherein the memory is formed to provide the datum to the check value circuit, and wherein the check value circuit is formed to check the datum provided thereto for errors and, if an error is present, output an error signal, with the steps of: influencing the check value circuit, the memory circuit, or the datum provided to the check value circuit so that the check value circuit would discover an error in a check in the case of correct execution of the error recognition functionality; receiving the error signal; and outputting an alarm signal indicating incorrect execution of the error recognition functionality, if the check value circuit does not output an error signal upon the step of influencing.

In accordance with a fourth aspect, the present invention provides a method for checking an error recognition functionality of a memory circuit, wherein the memory circuit has a memory formed to store a first and a second datum, a check value memory formed to store a first check value associated with the first datum and a second check value associated with the second datum, and a check value circuit formed to execute the error recognition functionality, wherein the second datum and the second check value lead to an error in a check, and wherein the memory and the check value memory are formed to provide the first or second datum and the respective associated check value to the check value circuit, and wherein the check value circuit is formed to check the first or second datum provided thereto for errors and, if an error is present, output an error signal at an error signal output, with the steps of: in a normal operation mode: transmitting the error signal to the error signal output; in a check mode: blocking the error signal so as not to transmit the same to the error signal output; receiving the error signal from the check value circuit; and outputting an alarm signal indicating incorrect execution of the error recognition functionality, if the check value circuit does not output an error signal, wherein the memory and the check value memory are formed to provide and check the first datum and the first check value in the normal operation mode, and to provide and check the second datum and the second check value in the check mode.

In accordance with a fifth aspect, the present invention provides a computer program with a program code for performing, when the computer program is executed on a computer, a method for checking an error recognition functionality of a memory circuit, wherein the memory circuit has a memory formed to store a datum and a check value circuit formed to execute the error recognition functionality, wherein the memory is formed to provide the datum to the check value circuit, and wherein the check value circuit is formed to check the datum provided thereto for errors and, if an error is present, output an error signal, with the steps of: influencing the check value circuit, the memory circuit, or the datum provided to the check value circuit so that the check value circuit would discover an error in a check in the case of correct execution of the error recognition functionality; receiving the error signal; and outputting an alarm signal indicating incorrect execution of the error recognition functionality, if the check value circuit does not output an error signal upon the step of influencing.

In accordance with a sixth aspect, the present invention provides a computer program with a program code for performing, when the computer program is executed on a computer, a method for checking an error recognition functionality of a memory circuit, wherein the memory circuit has a memory formed to store a first and a second datum, a check value memory formed to store a first check value associated with the first datum and a second check value associated with the second datum, and a check value circuit formed to execute the error recognition functionality, wherein the second datum and the second check value lead to an error in a check, and wherein the memory and the check value memory are formed to provide the first or second datum and the respective associated check value to the check value circuit, and wherein the check value circuit is formed to check the first or second datum provided thereto for errors and, if an error is present, output an error signal at an error signal output, with the steps of: in a normal operation mode: transmitting the error signal to the error signal output; in a check mode: blocking the error signal so as not to transmit the same to the error signal output; receiving the error signal from the check value circuit; and outputting an alarm signal indicating incorrect execution of the error recognition functionality, if the check value circuit does not output an error signal, wherein the memory and the check value memory are formed to provide and check the first datum and the first check value in the normal operation mode, and to provide and check the second datum and the second check value in the check mode.

The present invention is based on the finding that increased security against attacks on a memory circuit may be achieved by checking the error recognition functionality of the memory circuit for its efficiency during operation. Hereby, the advantage arises that within the scope of an attack a manipulation of the content of the memory means cannot be disguised by compromising the check value means in its functionality so that manipulated data that would actually have to be recognized as faulty in a check within the scope of a correct execution of the error recognition functionality are recognized as error-free.

To this end, the inventive apparatus forces one or more errors in the memory circuit by either influencing these so that a datum would have to cause an error signal of the check value means in a check, or providing a prepared datum with the associated check value, which would also have to lead to an error signal in a check, to the check value means. If the inventive apparatus and/or the monitoring means do not receive the expected error signal, a manipulation or an attack on the memory circuit is assumed. In this case, the monitoring means itself outputs an alarm signal indicating an attack taken place against other components to which the inventive apparatus is coupled.

In the embodiment, the monitoring means may manipulate a check value associated with a datum, provide the datum to the check value means in a state altered as opposed to the stored or read-out state, or manipulate the request signal for reading out a datum. Hereby, the advantage arises that the inventive apparatus disposes of various ways for checking the error recognition functionality, so that an attack on the memory circuit has to withstand a plurality of checks to stand a chance of successful execution.

A further advantage is that the check may be performed during operation. The check may be initiated by the presence of a trigger condition here. Hereby, an attack is made difficult for an attacker, because he or she does not only have to reckon with a check of the error recognition functionality at certain events, such as system startup, which represents a further advantage.

Moreover, the embodiment shows that the inventive apparatus can not only monitor outputting an error signal upon influence or upon a correspondingly prepared datum, i.e. that the inventive apparatus does not only monitor the check value means in the respect of detecting an error. Rather, it also permits a check of the error recognition functionality after successful error recognition, without an error being present. The advantage resulting therefrom is that hereby a potential attack is again made more difficult due to the increased complexity of the check, because an error signal is no longer expected from the monitoring means at every check by the same.

Figure 2:
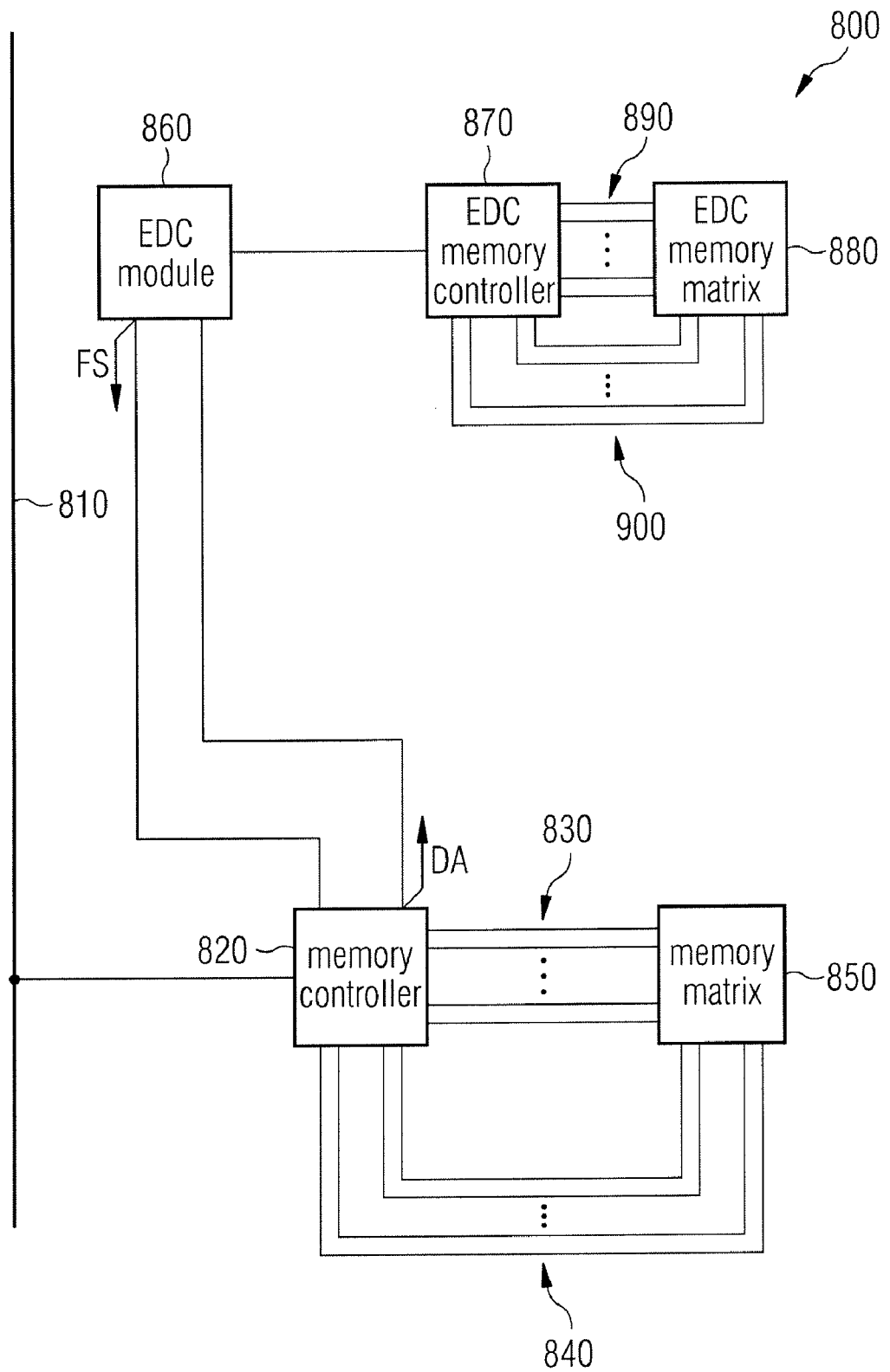
FIG. 2 shows a possible solution of a memory circuit with error recognition functionality.

With reference to FIG. 1, an embodiment of an apparatus for checking an error recognition functionality of a memory circuit will now be described. Similar or the same objects already having been explained in the introductory sections of the present application and shown in FIG. 2 are designated with reference numerals differing by 700.

FIG. 1 shows a block circuit diagram of an embodiment of a memory circuit 100 with an inventive apparatus for checking an error recognition functionality or EDC (error-detecting code) function of the memory circuit 100, as it may for example be employed within the scope of a security controller on a chip card. The memory circuit 100 is coupled to a bus 110, via which the memory circuit 100 is connected to other components of a security controller, a microcontroller, a chip card or a smartcard, i.e. for example a CPU (central processing unit), other memory circuits, an input/output module, a "pseudo" random number generator, a cryptoprocessor, or other cryptographic components or electronic components. The memory circuit 100 comprises a memory controller 120, also referred to as memory control unit and coupled to a memory matrix 150 via a plurality of word lines 130 also referred to as row selection lines and via a plurality of bit lines 140 also referred to as column selection lines or input/output lines.

Furthermore, the memory circuit 100 also comprises an EDC (error-detecting code) module 160 and an EDC memory controller 170 coupled to each other. The EDC memory controller 170 is connected to an EDC memory matrix 180 via a plurality of word lines 190 and a plurality of bit lines 200. The plurality of word lines 190 are often also referred to as row selection lines, the plurality bit lines 200 often also as column selection lines or input/output lines. The functioning of the objects and elements of the memory circuit 100 previously designated does not differ from the corresponding objects and elements of the memory circuit 800 shown in FIG. 2, which is why herewith reference is made to the introductory sections of the present application for the description of the functioning.

As opposed to the memory circuit 800 shown in FIG. 2, the memory circuit 100 comprises further elements, however, the arrangement and functioning of which will be described in the following. The memory controller 120, for example, is coupled to the bus 110 via an interrupter 210. The interrupter 210 in its turn is connected to an UmSLC (user mode sensor life control) module 220. Just like in the case of the memory circuit 800 from FIG. 2, the memory controller 120 of the memory circuit 100 shown in FIG. 1 is also coupled to the EDC module 160 via an internal data line. In contrast to the memory circuit 800 shown in FIG. 2, however, in the memory circuit 100 a manipulator 230 also connected to the UmSLC module 220 is connected into the internal data line between the memory controller 120 and the EDC module 160. Just like the memory circuit 800 from FIG. 2, the EDC module 160 is also connected to the memory controller 120 via an error signal line. In comparison with the memory circuit 800 from FIG. 2, a switch 240, which is in turn connected to the UmSLC module 220, is connected into the error signal line between the EDC module 160 and the memory controller 120.

Furthermore, the memory circuit 100 comprises an EDC manipulator 250 also connected to the UmSLC module 220 and connected between the EDC module 160 and the EDC memory controller 170. Moreover, the memory circuit 100 comprises a first influencer 260 and a second influencer 270 both coupled to the UmSLC module 220. The first influencer 260 is connected into the plurality of word lines 130 between the memory controller 120 and the memory matrix 150, while the second influencer is connected into the plurality of bit lines 140 between the memory controller 120 and the memory matrix 150.

The memory circuit 100 thus comprises a memory means 300 including the memory controller 120, the plurality of word lines 130, the plurality of bit lines 140, the memory matrix 150, the first influencer 260 and the second influencer 270. Furthermore, the memory circuit 100 comprises a check value means 310 including the EDC module 160, the EDC manipulator 250, the EDC memory controller 170, the plurality of word lines 190, the plurality of bit lines 200 and the EDC memory matrix 180. The EDC memory controller 170, the plurality of word lines 190, the plurality of bit lines 200 and the EDC memory matrix 100 form the check value memory means 315. A monitoring means or an alarm unit 320 of the memory circuit 100 includes the manipulator 230, the switch 240, the interrupter 210 and the UmSLC module 220.

In the normal operation mode, i.e. when the UmSLC module 220 does not check the error recognition functionality of the memory circuit 100, the additional components of the memory circuit 100, as opposed to the memory circuit 800 in FIG. 2, are brought to a neutral mode not modifying the functionality of the memory circuit. In particular, this means that the interrupter 210 connects the memory controller 120 to the bus 110. Likewise, the switch 240 connects the error signal line between the memory controller 120 and the EDC module 160. The manipulator 230 lets a datum DA pass freely on the internal data line between the memory controller 120 and the EDC module 160. The two influencers 260 and 270 leave the word lines 130 and the bit lines 140 unchanged.

Likewise, the EDC manipulator 250 does not change any signals exchanged between the EDC module 160 and the EDC memory controller 170. In the normal operation mode, the memory circuit 100 thus exhibits the behavior already described in the introductory sections of the present application and/or the functioning of the memory circuit 800 described there, to which reference is made herewith.

If the memory controller 120 obtains the instruction to read out a certain datum from a predetermined address of the memory means 300 via the bus 110 in form of a read command, for example from the CPU, the memory controller 120 drives the word lines 130 so that the memory matrix 150 forwards the associated datum to the memory controller 120 via the bit lines 140. The datum DA, together with the associated address, is then made available to the EDC module 160, which calculates a checksum on the basis of the datum DA and directs the EDC memory controller 170 to read out the checksum value or check value associated with the address from the EDM memory matrix via the bit lines 200 by corresponding control of the word lines 190 and make the same available to the EDC module 160. If the calculated checksum value satisfies a predetermined relationship with the stored checksum value, i.e. if they match, for example, no error signal FS will be made available to the memory controller 120 via the error signal line. However, if the two checksums do not meet the predetermined relation with respect to each other, i.e. if they deviate from each other, for example, an error signal FS is made available via the error signal line to the memory controller 120, which may then for example inform the CPU about corresponding feedback about an occurrence of an error.

By the additional components of the memory circuit 100, the embodiment of the present invention shown in FIG. 1 can achieve the object to realize and implement a novel so-called UmSLC function for the alarm unit 320 for protecting the memory or memory circuit so that logical countermeasures can be checked for recognition capability of attacks, i.e. for their effectiveness, during operation. As already explained, in the embodiment shown in FIG. 1, the memories are protected against errors by so-called error detection codes (EDC), also referred to as checksums or check values, according to the prior art. Within the scope of EDC storage of data, a simple parity bit, a CRC (cyclic redundancy check) checksum or a hash value, as it may for example be calculated with the aid of the hash algorithms MD2, MD4, MD5 or RIPEMD-160, may be used as checksums. Other methods by the aid of which the integrity of data DA can be checked may also be employed as checksum. Moreover, the division, shown in the embodiment of a memory circuit 100 shown in FIG. 1, of the actual data memory with the memory matrix 150 and the EDC memory with the EDC memory matrix 180 does not impose any restriction on the general feasibility of the present invention. Rather, the contents of both memories may also be stored physically in one and the same memory matrix.

If a predetermined trigger condition is satisfied, the UmSLC module 220 changes into a check mode from the normal operation mode and initiates the check of the error recognition functionality of the memory circuit 100. This trigger condition may for example be the elapse of a predetermined period of time or reaching a predetermined system time or the arrival of a corresponding CPU instruction. Randomly satisfying the trigger condition is also possible, as it may for example be realized by a (pseudo) random number generator and a corresponding predetermined proportion of the number range of the (pseudo) random number generator. In this connection, it is important that the trigger condition is an intermittently satisfied condition enabling normal writing and reading access to the memory circuit 100 and further enabling the initiation of the check of the error recognition functionality upon the trigger condition being satisfied. If the trigger condition is satisfied, the novel UmSLC function of the UmSLC module 220 now forces one or more errors in the memory, in order to check the EDC function of the memory circuit 100. To this end, at first the error signal FS of the EDC module 160 (alarm function) is redirected to the UmSLC module 220, also referred to as UmSLC control unit, by controlling the switch 240. Then, an error is simulated in the memory. The UmSLC control unit 220 then has to obtain an error notification, i.e. the error signal FS, from the EDC module 160. If an error notification or error signal is absent in the error recognition by the use of error-detecting codes, a manipulation or attack on the memory is assumed. Should this not take place, the UmSLC module 220 itself will generate an alarm signal AL or alarm at an alarm signal output, because in this case a manipulation or an attack is to be assumed. The alarm signal (AL) signals an attack taken place to other components that the security controller comprises, for example.

In a "correct case of operation", in which the EDC functionality of the check value means 310 works correctly, i.e. in which the UmSLC module 220 obtains the EDC error notification in form of the error signal FS, the memory error or simulation of the memory error is turned off again and the withdrawal of the EDC error notification, i.e. of the error signal FS, is awaited. The EDC alarm line, i.e. the error signal line, is then switched back again to the original alarm module, i.e. the memory controller 120 in the present embodiment, by controlling the switch 240. The inventive apparatus thus enables the check of the functionality of an error recognition circuit for memories and hence the possibility of attack detection for memories. In other words, the inventive apparatus for checking the error recognition functionality of a memory circuit thus advantageously solves the check of the attack detectors for memories and thus represents a UmSLC (user mode sensor life control) for memories.

In the further course of the present application, the generation of an error by four various interventions in the memory circuit 100 will be explained exemplarily on the basis of the embodiment of a memory circuit 100 shown in FIG. 1, with the errors being detected in case of a correct error recognition functionality of the memory circuit 100. Here, the four methods with which an error in the memory of the memory circuit 100 is simulated differ from the principle method executing the UmSLC module 220 in few points only. The use of the novel UmSLC or the inventive apparatus for checking the error recognition functionality of a memory circuit within the scope of a check of the attack detection for memories takes place in several steps:

a. The UmSLC module 220 directs the interrupter 210 to disconnect the memory controller 120 from the bus 110.
b. The UmSLC module 220 directs the switch 240 to redirect the error signal line so that the error signal FS no longer reaches the memory controller 120 but the UmSLC module 220.
c. The UmSLC module 220 activates one or more disturbance simulation units, which will be explained in greater detail in the further course of the present application. The group of the disturbance simulation means includes the manipulator 230, the EDC manipulator 250, the first influencer 260 and the second influencer 270. This step may also be omitted under certain circumstances described below.
d. The UmSLC module 220 directs the interrupter 210 to send a data request to the memory controller 120, wherein, via the interrupter 210 from the UmSLC module 220, the memory controller 120 is given a predetermined address or one determined thereby. Due to the data request, the memory controller 120 reads out a datum from the memory matrix 150 via the word lines 130 and the bit lines 140 and makes it available for further processing on the internal data line. Due to the interference of the disturbance simulation means, which were activated by the UmSLC module 220 in step c, if necessary, the EDC module 160 provides an error signal FS, which is not made available to the memory controller 120 but to the UmSLC module 220 by switching the switch 240, via the error signal line in the case of correct execution of the error recognition functionality.

Here, the address value may be predetermined or also be determined by the UmSLC module 220 or by another component, for example the CPU. It is also possible here, for example, that the UmSLC module 220 checks all memory regions or also only parts of the memory region of the memory circuit 100 in a planned order or in a random order. In case only parts of the memory space of the memory circuit 100 are checked, these may for example be such memory regions in which sensitive information, i.e. for example private keys or other access information is stored. It is also possible that, depending on the type of simulated disturbance, predetermined addresses or addresses selected from a predetermined address space in random manner are employed for performing the check of the error recognition functionality. Further details hereto will also be described further below.

e. If the UmSLC module 220 does not receive the error signal FS, the UmSLC module 220 outputs an alarm signal AL at the alarm signal output, whereupon the security controller, on which the memory circuit 100 is implemented, executes further steps not designated in detail here.
f. If the error signal FS has arrived at the UmSLC module 220, the activated disturbance simulation means are deactivated, if necessary.
g. The interrupter 210 is directed by the UmSLC module 220 to read out the datum concerned or also another datum to the memory controller 120.
h. If an error made available to the UmSLC module 220 via the switch 240 occurs again in the check of the datum DA read out from the security controller 120 by the EDC module 160, the UmSLC module 220 triggers an alarm by the UmSLC module 220 outputting an alarm signal AL at the alarm signal output.
i. If the UmSLC module 220 does not detect an error signal FS or if the existing error signal FS is deleted, the memory circuit 100 is reset to its original state. To this end, the switch 240 is again controlled so that the error signal may reach the memory controller 120 from the EDC module 160. Furthermore, the interruption of the memory controller 120 from the bus 110 is also cancelled by resetting the interrupter 210.

Possible countermeasures taken by the CPU or also the memory controller 120, for example, following the arrival of the alarm signal AL the UmSLC module 220 outputs in the case of a disturbance of the error recognition functionality, may for example consist in sensitive data being deleted, the CPU being halted, a reset of the chip card and/or the security controller including the memory circuit 100 being triggered, or the security controller or parts of the chip card being rendered useless in targeted manner by being destroyed.

In the further course of the present application, now four various simulations of disturbances will be described, which can be realized with the aid of the embodiment of a memory circuit 100 shown in FIG. 1 with an inventive apparatus for checking the error recognition functionality of the memory circuit 100. Here, the disturbance simulation means corresponding to and mentioned in steps c and f of the above-indicated sequence of the checking routine are activated or deactivated. Disturbance simulation means not mentioned here (see point c) may be omitted, if an implementation of the other possibilities for the simulation of disturbances within the scope of the other possibilities for checking the error recognition functionality is not intended. The embodiment shown in FIG. 1 thus enables to trigger disturbances within the scope of the check of the error recognition functionality of the memory circuit 100 with the aid of various approaches.

A first possibility for checking the error recognition functionality of the memory circuit 100 now consists in manipulating the EDC check values or check values, also referred to as EDC reference values, so that the EDC module 160 outputs an error signal on the error signal line when performing the error recognition functionality. Here, in principle, there are two possibilities to manipulate the EDC check values. On the one hand, there is the possibility to file partly faulty EDC check values in the EDC memory matrix 180 beforehand in addition to the data filed in the memory matrix 150. In this case, manipulation of the EDC reference values during the operation in the check mode is not necessary, and implementation of means from the group of disturbance simulation means may be omitted. On the other hand, hereby there is only the possibility to use memory cells prepared correspondingly beforehand for checking the error recognition functionality.

One alternative enabling to employ arbitrary memory locations within the scope of the check of the error recognition functionality is to modify the EDC check values read out from the EDC memory matrix 180 by correspondingly controlling the EDC manipulator 250. To this end, within the scope of step c of the above-indicated routine, the UmSLC module 220, for example, may control the EDC manipulator 250 so that it inverts one or more bits of the stored EDC checksum. The selection as to which bits are inverted by the EDC manipulator 250 may be predetermined or take place by the UmSLC module 220. As an alternative, it is possible not to have individual bits of the EDC reference value inverted by the EDC manipulator 250, but rather give the EDC module 160 a predetermined or also randomly determined EDC check value from the EDC manipulator 250.

In other words, on the one hand, there is the possibility to store EDC-wrong values in targeted manner or also manipulate the EDC check values in targeted manner. In the first case, this may for example be realized by intentionally filing incorrect EDC reference values in a ROM (read-only memory) memory region, by performing an NVM programming with intentionally disturbed EDC reference values (NVM=non-volatile memory), by performing a RAM (random access memory) utilization with intentionally wrong EDC reference values, or for example cache entries with intentionally wrong EDC or parity values. Within the scope of a test or the check of the error recognition functionality, it is attempted to read out these memory cells. Due to the prerequisites mentioned, as they are present from the UmSLC module 220 due to the above-described check routine, the incorrect EDC reference values then do not lead to an error signal being passed to components external to the memory circuit 100, i.e. to an alarm of the memory controller 120, but to correct test behavior within the scope of the test performed by the UmSLC module 220.

A second possibility or second embodiment for performing the check of the error recognition functionality by the UmSLC module 220 is that memory lines, for example the word lines 130 or also the bit lines 140, are not switched correctly within the scope of this test. This test may be executed so that for example one or more of the lines concerned of the plurality of bit lines 140 have a "stuck at 1" or a "stuck at 0" error, i.e. an error in which individual bits or the associated lines are set or clamped to a logic signal value corresponding to a logic 1 or a logic 0, independently of their actually intended value. This error is also supposed to be recognized by the EDC module 160 and forwarded to the UmSLC module 220 via the switch 240. In the embodiment shown in FIG. 1, this error may be caused by the second influencer 270 switched into the bit lines 140 being directed by the UmSLC module 220, in the third step of the above-described check routine, to clamp one or more lines of the plurality of bit lines 140 to a potential corresponding to a logic 0 or a logic 1. Both the selection of the bit lines 140 and the values to which the lines concerned are clamped may here be predetermined or take place by the UmSLC module 220.

A third embodiment of the error simulation is to let the control lines, e.g. the address lines or the word lines 130, not switch correctly for this test. This error source also generally leads to wrong readout values of the memory contents, which are to be recognized by the EDC module 160 and forwarded to the UmSLC module 220 via the switch 240. In the embodiment of a memory circuit 100 shown in FIG. 1, this may for example be done by the UmSLC module 220 controlling the first influencer 260 so that the same manipulates the word lines 130. Apart from the previously described possibility to clamp one or more lines of the plurality of word lines 130 to a logic value of 0 or a logic value of 1, the first influencer 260 may also influence the word lines 130 by exchanging individual lines in targeted manner or cyclically shifting the same by a predetermined value (for example by 1). Basically, for the error simulation means described further above, i.e. particularly for the EDC manipulator 250 and the second influencer 270, there is the possibility to exchange individual bits or the order of data lines, such as the bit lines 140, or shift the same cyclically by a predetermined value, for example by 1.

A fourth possibility or fourth embodiment for the simulation of an error for checking the error recognition functionality of the memory circuit 100 is that the EDC circuit and/or the check value means 310 or the alarm unit 320 is either switched or influenced by introducing and activating the manipulator 230 so that the data DA, which is output to the EDC module 160 from the memory controller 120 in the embodiment shown in FIG. 1, appear "wrong" to the EDC module 160. This influence or manipulation should be recognized by the EDC module 160 and forwarded to the UmSLC module 220 via the switch 240. This possibility of the error simulation may be realized in the embodiment of a memory circuit 100 shown in FIG. 1 by the UmSLC module 220 controlling the manipulator 230 so that the same influences or manipulates the datum DA output from the memory controller 120 so that the ensuing error recognition by the EDC module 160 fails, so that the EDC module 160 outputs the error signal FS. Here, there is the possibility that the manipulator 230 inverts a predetermined selection of the bits of the datum DA or one determined by the UmSLC module 220, sets the same to a logic value of 0 or a logic value of 1, or also performs a mixed form of these possibilities. Moreover, there is also the possibility of exchanging individual bits of the datum DA in targeted manner or also performing a cyclic shift by a predetermined value or one given by the UmSLC module 220 by 1, for example. Since only part of the data path is checked in this error simulation, this fourth possibility or this implementation is, however, disadvantageous in comparison with the previously described implementations.

A combination, i.e. a parallel use, or a sequential use of the possibilities of the error simulation, i.e. of the four above-described embodiments, is also possible. In case of a sequential application of various error simulation sources, not all steps of the above-described error check routine have to be performed at each pass.

Moreover, as already explained above, it is not necessary to implement all means of the group of disturbance simulation means, if not all possibilities for disturbance simulation are to be implemented. For example, if only an implementation of the first possibility is intended, an implementation of the disturbance simulation means is not necessary in the case of a limitation to previously manipulated data with correspondingly faulty EDC check values. In case of exclusive implementation of the first possibility without the limitation mentioned, the implementation of the manipulator 230, the first influencer 260 and the second influencer 270 may be omitted. In case of exclusive implementation of the second possibility or exclusive implementation of the third possibility, integration of the EDC manipulator 250 and the manipulator 230 may be omitted. Moreover, in case of exclusive implementation of the second possibility, the first influencer 260 may be omitted, and in case of exclusive implementation of the third possibility, the second influencer 270. In case of exclusive implementation of the fourth possibility, implementation of the first influencer 260, the second influencer 270 and the EDC manipulator 250 may be omitted.

Even if the actual memory for the data DA is physically separated from the memory including the EDC reference values or check values in the embodiment of a memory circuit 100 shown in FIG. 1, this does not represent a limitation of the present invention, but has rather been done for the illustration of the various possibilities of the disturbance simulations. Embodiments in which the check values are stored in the same physical memory matrix together with the data DA are indeed possible. Here, the storage of a particular datum and the associated checksum or the associated EDC reference value, i.e. the associated check values, may take place at the same or a different logical address depending on design of the memory.

Moreover, it also is to be noted that the invention is not limited to word-organized memories, as the embodiment shown in FIG. 1 indicates. Rather, also bit-organized memories may be used for the storage of both the EDC check values and the data.

Both fixed-value memories, i.e. for example ROM (read-only memory) memories, and memories enabling reading and writing accesses, may be employed as memories. Examples for the latter memories are RAM (random access memory) memories, non-volatile memories (NVM), such as flash memories or EEPROM (electrically erasable programmable read-only memory) memories, or also cache memories. Depending on the memory type used, the communication of the memory with other components, such as the CPU, does not necessarily take place via a bus, as it is shown in FIG. 1, but via another data link, so that the bus 110 shown in FIG. 1 also does not represent a limitation of the present invention.

Depending on the circumstances, the inventive method for checking an error recognition functionality of a memory circuit may be implemented in hardware or in software. The implementation may be effected on a digital storage medium, in particular a floppy disk, a CD or a DVD comprising electronically readable control signals, which may cooperate with a programmable computer system, such that the inventive method for checking an error recognition functionality of a memory circuit is executed. Thus, the invention generally also consists in a computer program product having a program code, stored on a machine-readable carrier, for performing the inventive method, when the computer program product runs on a computer. In other words, the invention may thus be realized as a computer program having a program code for performing the method, when the computer program is executed on a computer. A computer is to be seen as any form of processor designed to execute a program or a program code, i.e. particularly also microcontrollers on a chip card, a smartcard or other integrated circuit.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for checking an error recognition functionality of a memory circuit, wherein the memory circuit comprises a memory that stores a datum and a check value circuit that executes the error recognition functionality, wherein the memory provides the datum to the check value circuit, and wherein the check value circuit checks the datum provided thereto for errors and, if an error is present, outputs an error signal, comprising:

a monitor that is coupled to the check value circuit, influences the check value circuit to act faulty, the memory to provide a substitute datum at an address different from an address from where the datum is to be read, or the datum provided to the check value circuit to experience a bit modification so that the check value circuit discovers an error in a check in a case of correct execution of the error recognition functionality, and the monitor outputs an alarm signal indicating incorrect execution of the error recognition functionality, if the check value circuit does not output an error signal to the monitor upon the influence.

2. The apparatus of claim 1, wherein the check value circuit determines an actual value from the datum provided thereto by applying a predetermined operation, compares the actual value with a check value stored in a check value memory, and outputs the error signal if the actual value and the check value do not satisfy a predetermined relation with respect to each other.

3. The apparatus of claim 2, wherein the monitor achieves the influence by manipulation of the check value.

4. The apparatus of claim 1, wherein the monitor achieves the influence by manipulation of the memory so that the memory, when providing the datum for the check value circuit, provides the datum to the check value circuit in a state changed as opposed to a stored state of the datum.

5. The apparatus of claim 1, wherein the monitor achieves the influence by manipulation of the datum provided to the check value circuit, so that the datum is changed as opposed to a read-out state of the datum.

6. The apparatus of claim 1, wherein the memory reads out the datum provided to the check value circuit upon a request signal indicating the datum, and stores a further datum, and wherein the monitor achieves the influence by manipulation of the request signal of the memory.

7. The apparatus of claim 1, wherein the monitor influences the check value circuit, the memory or the datum provided to the check value circuit for the influence when a predetermined trigger condition is satisfied, and does not influence the check value circuit, the memory and the datum provided to the check value circuit when the trigger condition is not satisfied.

8. The apparatus of claim 7, wherein the predetermined trigger condition is satisfied intermittently.

9. The apparatus of claim 1, wherein the monitor further causes, following the reception of the error signal, upon the influence of the check value circuit, the memory or the datum provided to the check value circuit, the memory to provide, without influencing the check value circuit, the memory or the datum provided to the check value circuit or a further datum, the datum or the further datum to the check value circuit and, if the monitor receives a further error signal from the check value circuit thereupon, outputs the alarm signal.

10. The apparatus of claim 1, wherein the memory circuit checks the datum for errors upon a read command and outputs the datum if no error is present.

11. An apparatus for checking an error recognition functionality of a memory circuit, wherein the memory circuit comprises a memory that stores a first and a second datum, a check value memory that stores a first check value associated with the first datum and a second check value associated with the second datum, and a check value circuit that executes the error recognition functionality, wherein the second datum and the second check value lead to an error in a check, and wherein the memory and the check value memory provide the first or second datum and the respective associated check value to the check value circuit, and wherein the check value circuit checks the first or second datum provided thereto for errors and, if an error is present, outputs an error signal at an error signal output, comprising:
a monitor that transmits the error signal to the error signal output in a normal operation mode and blocks the error signal in a check mode so as not to transmit the same to the error signal output and outputs an alarm signal indicating incorrect execution of the error recognition functionality, if the check value circuit does not output an error signal to the monitor,
wherein the memory and the check value circuit provide and check the first datum and the first check value in the normal operation mode and provide and check the second datum and the second check value in the check mode.

12. The apparatus of claim 11, wherein the check value circuit determines an actual value from the first or second datum provided thereto by applying a predetermined operation, compares the actual value with a check value stored in a check value memory, and outputs the error signal if the actual value and the check value do not satisfy a predetermined relation with respect to each other.

13. The apparatus of claim 11, wherein the monitor changes into the check mode if a predetermined trigger condition is satisfied, and changes into the normal operation mode if the trigger condition is not satisfied.

14. The apparatus of claim 13, wherein the predetermined trigger condition is satisfied intermittently.

15. The apparatus of claim 11, wherein the monitor further provides, after receiving the error signal from the monitor after the check of the second datum and the second check value for an error, the first datum and the first check value to the check value circuit for checking for an error, to effect a check of the second datum and the second check value, and outputs the alarm signal if the monitor thereupon receives a further error signal from the check value circuit.

16. The apparatus of claim 11, wherein the memory circuit checks the first datum for errors upon a read command and outputs the same if no error is present.

17. A method for checking an error recognition functionality of a memory circuit, wherein the memory circuit comprises a memory that stores a datum and a check value circuit that executes the error recognition functionality, wherein the memory provides the datum to the check value circuit, and wherein the check value circuit checks the datum provided thereto for errors and, if an error is present, outputs an error signal, comprising:
influencing the check value circuit to act faulty, the memory circuit to provide a substitute datum at an address different from an address from where the datum is to be read, or the datum provided to the check value circuit to experience a bit modification so that the check value circuit discovers an error in a check in the case of correct execution of the error recognition functionality;
receiving the error signal; and
outputting an alarm signal indicating incorrect execution of the error recognition functionality, if the check value circuit does not output an error signal upon the step of influencing.

18. A method for checking an error recognition functionality of a memory circuit, wherein the memory circuit comprises a memory that stores a first and a second datum, a check value memory that stores a first check value associated with the first datum and a second check value associated with the second datum, and a check value circuit that executes the error recognition functionality, wherein the second datum and the second check value lead to an error in a check, and wherein the memory and the check value memory provide the first or second datum and the respective associated check value to the check value circuit, and wherein the check value circuit checks the first or second datum provided thereto for errors and, if an error is present, outputs an error signal at an error signal output, comprising:
in a normal operation mode:
transmitting the error signal to the error signal output;
in a check mode:
blocking the error signal so as not to transmit the same to the error signal output;
receiving the error signal from the check value circuit; and
outputting an alarm signal indicating incorrect execution of the error recognition functionality, if the check value circuit does not output an error signal,
wherein the memory and the check value memory provide and check the first datum and the first check value in the normal operation mode, and provide and check the second datum and the second check value in the check mode.

19. A computer program product embodied on a computer-readable storage medium and comprising a program code for performing, when the computer program is executed on a computer, a method for checking an error recognition functionality of a memory circuit, wherein the memory circuit comprises a memory that stores a datum and a check value circuit that executes the error recognition functionality, wherein the memory provides the datum to the check value circuit, and wherein the check value circuit checks the datum provided thereto for errors and, if an error is present, outputs an error signal, comprising:
influencing the check value circuit to act faulty, the memory circuit to provide a substitute datum at an address different from an address from where the datum is to be read, or the datum provided to the check value circuit to experience a bit modification so that the check value circuit discovers an error in a check in the case of correct execution of the error recognition functionality;
receiving the error signal; and
outputting an alarm signal indicating incorrect execution of the error recognition functionality, if the check value circuit does not output an error signal upon the step of influencing.

20. A computer program product embodied on a computer-readable storage medium and comprising a program code for performing, when the computer program is executed on a computer, a method for checking an error recognition functionality of a memory circuit, wherein the memory circuit comprises a memory that stores a first and a second datum, a check value memory that stores a first check value associated with the first datum and a second check value associated with the second datum, and a check value circuit that executes the error recognition functionality, wherein the second datum and the second check value lead to an error in a check, and wherein the memory and the check value memory provide the first or second datum and the respective associated check value to the check value circuit, and wherein the check value circuit checks the first or second datum provided thereto for errors and, if an error is present, outputs an error signal at an error signal output, comprising:
   in a normal operation mode:
      transmitting the error signal to the error signal output;
   in a check mode:
      blocking the error signal so as not to transmit the same to the error signal output;
      receiving the error signal from the check value circuit; and
      outputting an alarm signal indicating incorrect execution of the error recognition functionality, if the check value circuit does not output an error signal,
wherein the memory and the check value memory provide and check the first datum and the first check value in the normal operation mode, and provide and check the second datum and the second check value in the check mode.

21. A memory circuit comprising:
a memory that stores a datum;
a check value circuit that executes an error recognition functionality of the memory circuit,
wherein the memory provides the datum to the check value circuit, and wherein the check value circuit checks the datum provided thereto for errors and, if an error is present, outputs an error signal;
a monitoring means, which is coupled to the check value circuit, for receiving the error signal and for influencing the check value circuit to act faulty, the memory to provide a substitute datum at an address different from an address from where the datum is to be read, or the datum provided to the check value circuit to experience a bit modification so that the check value circuit discovers an error in a check in a case of correct execution of the error recognition functionality, and for outputting an alarm signal indicating incorrect execution of the error recognition functionality, if the check value circuit does not output an error signal to the monitoring means upon the influence.

* * * * *